May 1, 1945.   A. R. ASKUE   2,375,065

CONVEYER

Filed March 17, 1943

INVENTOR.
ALBERT R. ASKUE
BY Bates Teare & McBean
ATTORNEYS

Patented May 1, 1945

2,375,065

UNITED STATES PATENT OFFICE 2,375,065

CONVEYER

Albert R. Askue, Mentor, Ohio, assignor to The Cleveland Trencher Company, Cleveland, Ohio, a corporation of Ohio Application March 17, 1943, Serial No. 479,469

8 Claims. (Cl. 198—202)

This invention relates to an improved belt conveyer and more particularly to an improved belt conveyer for use in connection with excavating machinery and the like. More specifically the invention relates to a guide for a flexible looped conveyer belt which will maintain the belt in alignment with its supporting rollers or drums, despite unequal distribution of heavy loads on the conveyer. These, therefore, are the general objects of the present invention.

A more specific object of this invention is the provision of a belt type conveyer having a guide mechanism to prevent lateral movement or shifting of the belt, without increasing the power required to drive the conveyer.

Other objects and advantages of the invention will become more apparent from the following description, reference being had to the accompanying drawing which illustrates practical embodiments thereof. The essential features of the invention will be summarized in the claims.

Figure 1:
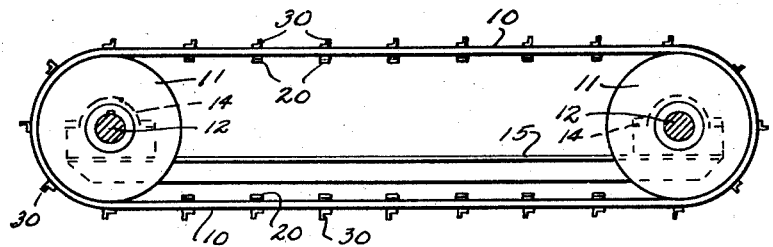
Figure 2:
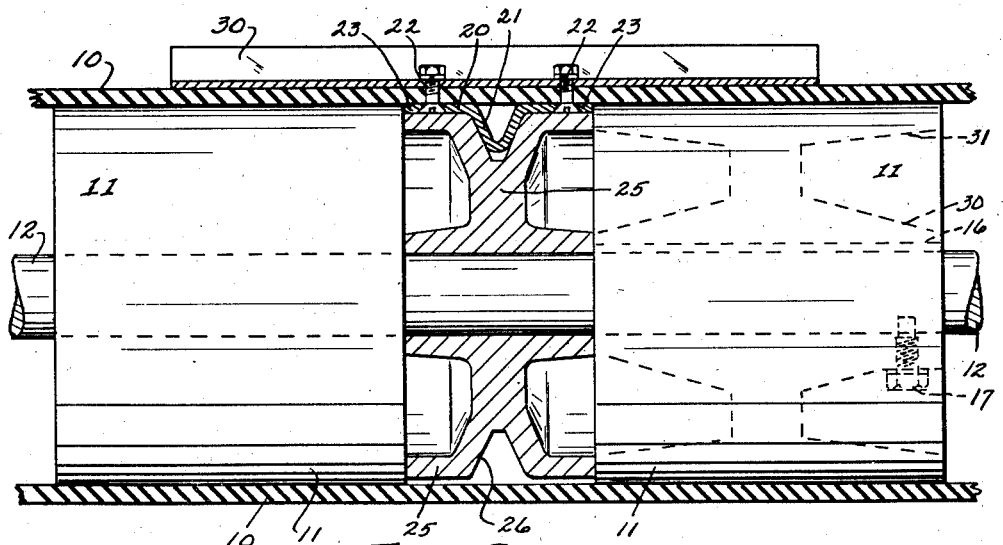
Figure 3:
Figure 4:
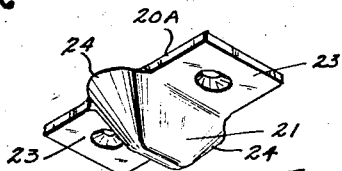

In the drawing, Fig. 1 illustrates a belt type conveyer embodying my invention; Fig. 2 is an enlarged sectional view as indicated by the lines 2—2 of Fig. 1; Fig. 3 is a perspective view of a guide element; and Fig. 4 is a view, similar to Fig. 3, of a modified form of guide element.

Referring to the drawing in detail and particularly to Fig. 1, it will be seen that the improved conveyer comprises an endless belt 10 made of rubber, fabric or other flexible material. The belt is looped about supporting units, comprising drums 11 mounted, as will be hereinafter more fully described, on shafts 12 which are journalled in bearings 14 carried by a suitable frame structure 15. Usually the bearings for one of the shafts is adjustable, relative to the frame, for movement to and from the other shaft. This enables the belt 10 to be tensioned so that it may be driven by frictional contact with the periphery of certain of the supporting drums. Such adjustable or "take-up" mechanisms, as well as driving mechanisms for rotating the driving shaft 12, are too well known to require either an illustration or a description of them to enable a complete understanding of the present invention.

Each supporting shaft 12 carries two or more drums 11, the number used being determined by the width of conveyer belt required to accomplish the desired purpose. Two drum shafts have been shown in Fig. 1, however the conveyer belts are often supported intermediate their looped ends by other supporting drums. Certain of the drum shafts are used as belt driving members while others are merely supporting shafts. The shaft illustrated in Fig. 2 is a driving unit, and is provided with a pair of spaced belt driving drums or rollers 10. Each drum 11, is drivingly connected to the shaft by a key 16, and is secured against axial movement relative to the shaft by a set screw 17. However any suitable driving connection may be used to drive and prevent lateral movement of the drums 11.

Transverse movement of the conveyer belt is prevented by clips 20 which are secured at spaced intervals in a row on the inner surface of the belt by bolts 22. These aligned clips coact with a guide pulley 25 positioned on the shaft 12 intermediate the two drums 11. Each clip 20 comprises a flat plate member having its intermediate portion formed into a V 21 which engages an annular groove 26 in the guide pulley 25, while the surfaces 23 of the clip, at either side of the V bear directly on the periphery of the guide pulley. It will be noted that the clip is the same width as the distance between the two driving drums. This assists the V shaped portion of the clip in aligning the belt. The arrangement is such that the V portion 21 of the clip 20 acts as a cam to move the belt transversely into position, the final alignment being accomplished by the ends of the clips which coact with the sides of the drum.

To compensate for differences in peripherical speeds between the guide pulley 25 and the drive pulleys, as well as to prevent excessive wear on the surfaces of guide clip, the guide pulley 25 is rotatably mounted on the shaft 12. Furthermore it will be noted that above each clip is a transversely extending angle or cleat 30. The cleats 30 are secured to the belts by the bolts 22 heretofore described, the belt being clamped between the clips 20 and the cleats 30. The cleats are of such length that they extend over the drums 11 as indicated at 31. Thus the cleats support the clips so that they normally merely touch the guide pulley without any pressure between the coacting surfaces. Therefore as long as the belt remains in transverse alignment there is substantially no wear, on either the guide pulley 25 or the clips 20. The clamping of the belt between the clips 20 and the cleats 30 prevents damage to the belt while the clips are camming the belt into alignment.

The diameter of the pulley 25 is smaller than the diameter of the drums 11. The difference between these diameters is at least equal to twice the thickness of the wings 23 of the clips 21. This permits the belt 10 to remain substantially flat as it passes over the supporting drums 11, and thus eliminates destruction of the belt which would result were the wings of the clips to pass over the drums 11 or over a pulley the diameter of which was not smaller than that of the drums.

The length of the clip 21 is retained at a minimum consistent with the aligning action required. Due to the shortness of the clip in comparison with the diameter of the pulley, the clip may be made flat without distorting the belt as the clip passes around a pulley 25. In determining the external diameter of the pulley, normal variations in the thickness of the clip are taken into consideration, as well as the desirability that no driving contact take place between the wings 23 of the clip and the pulley 25 under normal conditions. To this end the radius of the pulley is preferably less than the radius of the drums by a distance slightly in excess of the normal thickness of the wings 23 of the clips 21.

While the invention has been described in connection with a drive shaft assembly it will be understood that it is also applied to idler shaft assemblies, in which case anti-friction bearings are disposed between the hubs 32 and rims 33 of the drums. These bearings are preferably of the type which maintain alignment between the two parts of the drums. As idler drums of this type are well known they have not been illustrated herein.

In Fig. 4, there is illustrated a modified form of guide clip. This clip is substantially the same as the clip 20, illustrated in Fig. 3. In the modified form, the ends of the V shaped or cam portions 21 of the clips are rounded as indicated at 24. This facilitates the entrance of the clips into the groove of the guide pulley without undue wear and aids in the camming of the belt into alignment without undue loss of driving power.

The arrangement used to guide or align the conveyer belt transversely, as above described, prolongs the life of the belt, by maintaining it in transverse alignment despite unequally distributed loads or impacts due to loads falling onto the belt. Furthermore, as the guiding or aligning means is normally inactive the wear on such mechanism is also slight and the power required to operate the conveyer is maintained at a minimum.

I claim:

1. A conveyer comprising a flexible belt, a supporting assembly for said belt including a shaft, a belt supporting drum mounted on said shaft, guide means carried by said belt, said assembly including guide means to coact with said first named guide means to guide the belt into transverse alignment relative to said shaft, and means to prevent transverse pressure between said first and second named guide means when said belt is in alignment.

2. A conveyer comprising a flexible belt, a supporting assembly for said belt including a shaft, a pair of spaced belt supporting drums mounted on said shaft, a row of spaced longitudinally aligned clip members secured to said belt and having cam portions arranged to extend into the space between said drums as the belt progresses, means carried by said assembly to engage said cam portions to move the belt into transverse alignment relative to said shaft, and means carried by said clips and coacting with said drums to prevent transverse pressure between said means and the cam portion of said clips when said belt is in alignment.

3. A conveyer comprising a flexible belt, a supporting unit for said belt including a shaft, a pair of spaced belt supporting drums mounted on said shaft and secured against axial movement relative to the shaft, a plurality of clips spaced lengthwise of said belt and having cam portions extending inwardly relative to the belt loop, a pulley having an annular groove therein mounted on said shaft intermediate said drums to engage said clips and move said belt into transverse alignment relative to said shaft, and means to prevent transverse pressure between the cam portion of said clips and said pulley when the belt is in alignment.

4. A conveyer comprising a flexible belt, a supporting unit for said belt including a shaft, a pair of spaced belt supporting rollers drivingly mounted on said shaft and secured against axial movement relative to the shaft, a plurality of clips spaced in a continuous row lengthwise of said belt and having depending V shaped lugs thereon, a pulley having a V shaped annular groove therein rotatably mounted on said shaft intermediate said drums to engage said clips and move said belt into transverse alignment relative to said shaft, and means to prevent pressure between said clips and said pulley when the belt is in alignment, and wherein said last-named pulley is constructed and arranged to engage said clip and said last-named means without contacting with the surface of the belt.

5. A conveyer comprising a flexible belt, a supporting unit for said belt including a shaft, means on said shaft to support said belt, a plurality of clips spaced in a lengthwise row on the inner side of said belt and having depending cam formations thereon, a pulley having a V shaped annular groove therein rotatably mounted on said shaft, means to prevent axial movement of said pulley whereby said pulley will engage said clips and move said belt into transverse alignment relative to said shaft, and means coacting with the belt supporting means to prevent pressure between said clips and said pulley when the belt is in alignment, and wherein said last-named pulley is constructed and arranged to engage said clip and said last-named means without contacting with the surface of the belt.

6. A conveyer comprising a flexible looped belt, a supporting unit for each end of said belt, one of said units comprising a drive shaft, a pair of belt spaced supporting drums drivingly mounted on said shaft, means to secure said drums against axial movement on said shaft, a grooved pulley rotatably mounted on said shaft intermediate said drums, means to prevent axial movement of said pulley, a plurality of plate like members spaced in a row longitudinally of said belt intermediate its edges, the width of said plates being substantially the same as the distance between said drums, each plate having a depending cam surface, to engage the groove in said pulley and cam the belt into position transversely of said shaft so that the ends of said clips will coact with the adjacent sides of said drums, a rigid member extending across said belt in the region of each clip, said members extending over the drums to support the clip independent of said grooved pulley and thereby prevent pressure between said clip and said grooved pulley when said belt is in transverse alignment.

7. A conveyer comprising a flexible looped belt, a supporting unit for each end of said belt, said units each comprising a shaft, a pair of belt supporting drums drivingly mounted on each shaft, means to secure said drums against axial movement on their respective shafts, a pulley having an annular V shaped groove rotatably mounted on each shaft intermediate its respective drums and coacting with said drums to prevent axial movement of said pulley, a plurality of plate like members spaced longitudinally of said belt and intermediate its edges, the width of said plates being substantially the same as the distance between said drums, each plate having a V shape depending cam surface to engage the grooves in the pulley and cam the belt into position transversely of said shaft so that the ends of said clips coact with the adjacent sides of said drums, a rigid cleat on top of said belt over each clip, said cleat extending sidewise across the adjacent drums to support the clip independent of said grooved pulley and thereby prevent pressure between said clip and said grooved pulley when said belt is in transverse alignment.

8. A guide means for a conveyer belt comprising a shaft, a pair of spaced belt supporting drums fixed to said shaft, a grooved pulley rotatably mounted on said shaft intermediate said drums, means to prevent axial movement of said pulley, a plurality of plate like members spaced longitudinally of said belt intermediate its edges the width of said plates being substantially the same as the distance between said drums, each plate having a V shaped depending cam surface, to engage the groove in said pulley and cam the belt into position transversely of said shaft, so that the ends of said clips coact with the adjacent sides of said drums, a rigid cleat on top of said belt over each clip, said cleat extending transversely of said belt beyond the ends of said clips, and means to engage the belt in the region of said cleats to maintain the clips a predetermined distance from the axis of said shaft to thereby prevent pressure between said clips and said pulley when the belt is in alignment with said pulley.

ALBERT R. ASKUE.